United States Patent Office 2,776,282
Patented Jan. 1, 1957

2,776,282

CYCLIC AMIDES OF α-TOLUIC ACIDS AND DERIVATIVES THEREOF

John W. Cusic, Skokie, Ill., assignor, by mesne assignments, to G. D. Searle & Co., Skokie, Ill., a corporation of Delaware No Drawing. Application May 4, 1954,
Serial No. 427,647

11 Claims. (Cl. 260—247.2)

The present invention relates to a new class of cyclic amides, and, more particularly, to α-dialkylaminoalkyl and α-heterocyclylalkyl substituted cyclic amides of α-toluic acids and derivatives thereof. The compounds which constitute my invention can be represented by the general structural formula

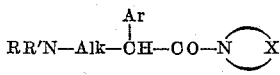

wherein Ar is a lower aryl radical, Alk is a lower bivalent saturated aliphatic hydrocarbon radical, RR'N is an amino, a lower alkyl substituted amino, or a nitrogen-containing heterocyclyl radical attached to the radical Alk through the nitrogen heteroatom and X is either a —CH₂CH₂—O—CH₂CH₂— radical or a lower alkylene radical.

In the foregoing structural formula the radical Ar represents a lower aryl radical and preferably a monocyclic aryl hydrocarbon radical containing 6 to 9 carbon atoms such as a phenyl radical or a lower alkylated phenyl radical such as tolyl, xylyl, cumyl, and the like.

The radical Alk is a lower alkylene radical. This radical is derived from a straight-chain or branched-chain hydrocarbon such as methylene, ethylene, propylene, butylene, amylene, hexylene, or a polymethylene radical such as trimethylene, tetramethylene, pentamethylene, and hexamethylene.

The radicals R and R' can represent a hydrogen or a lower alkyl group such as methyl, ethyl, straight-chained or branched propyl, butyl, amyl and hexyl. The radical RR'N can also be a saturated nitrogen-containing heteromonocyclic group attached to the radical Alk through a nitrogen in the heteromonocycle of the same type as the radical

The radical

can be a morpholino radical or a radical wherein X constitutes a lower alkylene radical containing 4 to 7 carbon atoms of which at least 4 and no more than 5 are in nuclear position; examples for the heterocycles thus formed are pyrrolidine, piperidine, dimethylpyrrolidine, and dimethylpiperidine (lupetidine).

The organic bases of the foregoing type form pharmaceutically useful salts which are non-toxic in therapeutic dosage with a variety of inorganic and strong organic acids including sulfuric, phosphoric, hydrochloric, hydrobromic, sulfamic, citric, ascorbic and related acids. They also form quaternary ammonium salts with a variety of organic esters of sulfuric, hydrohalic and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, diethyl sulfate, methyl benzenesulfonate, ethyl toluenesulfonate, ethylene chlorohydrin, propylene chlorohydrin, allyl bromide, methallyl bromide and crotyl bromide.

The object of this invention is to provide new chemical substances of the type indicated above. These new substances possess a number of highly useful therapeutic properties. The bases and their simple acid addition salts provide valuable diuretic and cardioregulatory agents. The quaternary ammonium salts are also active ganglion blocking and depressor agents and can serve as active ingredients in parasiticidal compositions of matter.

One of the convenient methods for the preparation of the compounds of my invention utilizes the condensation of a cyclic amide of an α-toluic acid with a basically substituted alkyl halide in the presence of an amide of lithium or sodium according to the following reaction scheme:

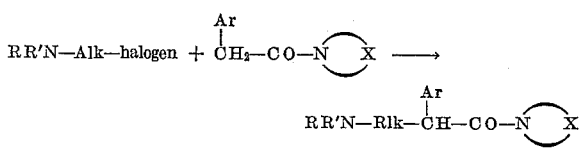

The reaction is carried out by heating the reactants in an inert anhydrous organic solvent such as a lower aromatic hydrocarbon radical, e. g. benzene, toluene, or xylene.

Alternatively, the above cyclic amide of the α-toluic acid is treated with an alkyl dihalide of the type halogen-alk-halogen to form a compound of the structural formula

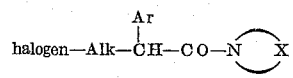

which is then condensed with ammonia or an amine of the formula RR'NH. This reaction is particularly suitable for the compounds in which either or both of the radicals R and R' is a hydrogen atom.

The following examples illustrate in further detail certain of the compounds which comprise this invention and methods for their preparation. However, this invention is not to be construed as limited thereby in spirit or in scope. It will be apparent to those skilled in the art that many modifications in materials and methods can be made without departing from the invention. In these examples, relative amounts of materials are indicated in parts by weight and pressures in millimeters (mm.) of mercury.

EXAMPLE 1

*N-(α-phenyl-γ-diethylaminobutyryl)pyrrolidine*

160 parts of pyrrolidine, 154.5 parts of α-toluyl chloride and 870 parts of anhydrous toluene are mixed with cooling and permitted to stand at room temperature for 12 hours. Warm dilute hydrochloric acid is added and the toluene solution is separated, dried over anhydrous calcium carbonate, filtered and evaporated. The residual N-α-toluylpyrrolidine is distilled at about 172–178° C. and 3 mm. pressure.

A stirred mixture of 50 parts of the distillate, 8 parts of lithium amide, 50 parts of β-chloroethyldiethylamine, and 450 parts of anhydrous toluene is refluxed for 12 hours, cooled and extracted with dilute hydrochloric acid. The extract is rendered alkaline by addition of dilute sodium hydroxide and extracted with ether. This ether extract is dried over anhydrous potassium carbonate, filtered and evaporated to yield N-(α-phenyl-γ-diethylaminobutyryl)pyrrolidine which is distilled at about 176–180° C. and 2 mm. pressure.

The distillate is dissolved in butanone and treated with one equivalent of a 25% solution of anhydrous hydrogen chloride in isopropanol. On cooling a crystalline hydrochloride is obtained which melts at about 175–177° C. This salt has the structural formula

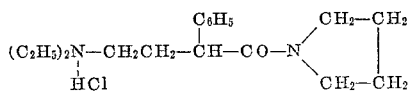

EXAMPLE 2

*N-(α-cumyl-γ-N-piperidinobutyryl)pyrrolidine*

80 parts of pyrrolidine, 98 parts of cumyl-acetyl chloride and 500 parts of anhydrous toluene are mixed with cooling and permitted to stand at room temperature for 10 hours. Warm dilute hydrochloric acid is added and the toluene layer is separated and concentrated by vacuum distillation. 122 parts of the oily p-isopropylphenylacetylpyrrolidine, 16 parts of lithium amide, 110 parts of N-β-chloroethylpiperidine, and 1000 parts of anhydrous toluene are refluxed with good agitation for 12 hours and then chilled and treated with dilute aqueous hydrochloric acid. The aqueous layer is separated, washed with ether, made alkaline by addition of dilute sodium hydroxide and extracted with ether. This ether extract is dried over anhydrous potassium carbonate, filtered and evaporated to yield N-(α-cumyl-γ-n-piperidinobutyryl)pyrrolidine which is distilled at about 220–230° C. and 1 mm. pressure. The compound has the structural formula

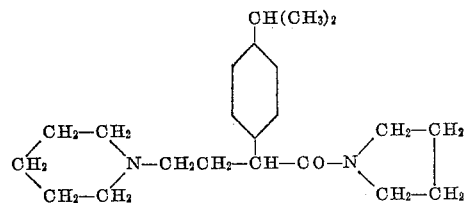

EXAMPLE 3

*N-(α-phenyl-γ-diethylaminobutyryl)piperidine*

90 parts of piperidine, 72.3 parts of α-toluyl chloride and 450 parts of anhydrous toluene are mixed slowly with cooling. After 5 hours standing, the precipitate is removed by filtration. The filtrate is washed with dilute hydrochloric acid and water and then evaporated under vacuum. Distillation of the residue at 2 mm. pressure yields N-α-toluylpiperidine at about 188–190° C. A mixture of 75 parts of N-α-toluylpiperidine, 10 parts of lithium amide and 700 parts of anhydrous toluene is stirred and refluxed for 3½ hours. Then 55 parts of β-chloroethyldiethylamine are added to the suspension containing the lithio derivative of N-α-toluylpiperidine and refluxing is continued for 3 hours. The resulting reaction mixture is cooled and treated with dilute aqueous hydrochloric acid. The aqueous layer is rendered alkaline by addition of dilute potassium hydroxide and extracted with ether. The ether extract is dried over anhydrous potassium carbonate, filtered and evaporated. N-(α-phenyl-γ-diethylaminobutyryl)-piperidine is obtained on vacuum distillation at 177–179° C. and 2 mm. pressure. Treatment of a butanone solution with alcoholic hydrogen chloride yields the crystalline hydrochloride which melts at about 174–175° C. This salt has the structural formula

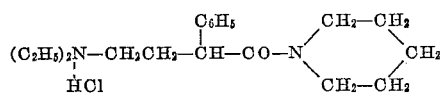

EXAMPLE 4

*N-(α-phenyl-γ-diisopropylaminobutyryl)piperidine*

A mixture of 60 parts of N-α-toluylpiperidine, 60 parts of the hydrochloride of β-chloroethyldiisopropylamine, 18 parts of lithium amide and 450 parts of anhydrous toluene is refluxed and stirred for 20 hours and then treated with ice and dilute hydrochloric acid. The aqueous layer is separated, rendered alkaline by addition of dilute sodium hydroxide and extracted with ether. The extract is dried over anhydrous potassium carbonate, filtered and evaporated to yield N-(α-phenyl-γ-diisopropylaminobutyryl)-piperidine as an oil which is distilled at about 213–218° C. and 2 mm. pressure. Treatment of a butanone solution with alcoholic hydrogen chloride, concentration and cooling yields the crystalline hydrochloride which, recrystallized from a mixture of isopropanol and ethyl acetate, melts at about 188–190° C. It has the structural formula

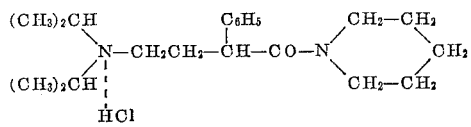

EXAMPLE 5

*N-[α-(o-tolyl)-ω-dimethylaminohexanoyl]piperidine*

12 parts of 2,6-lupetidine, 20 parts of o-tolylacetyl chloride and 100 parts of dry toluene are mixed slowly with cooling and permitted to stand at room temperature for 10 hours. The reaction mixture is filtered and the filtrate is washed successively with dilute hydrochloric acid and water and then evaporated to yield N-(o-tolylacetyl)-2,6-lupetidine as an oil. An anhydrous mixture of 18 parts of this oil, 2 parts of lithium amide, 11 parts of δ-chlorobutyldimethylamine and 70 parts of toluene is turbinated at reflux temperature for 15 hours, cooled and treated with dilute aqueous hydrochloric acid. The aqueous layer is separated, washed with ether, rendered alkaline by addition of dilute potassium hydroxide and extracted with ether. This extract is dried over anhydrous potassium carbonate, filtered and evaporated to yield N-[α-(o-tolyl)-ω-dimethylaminohexanoyl]piperidine as an oil which is distilled at about 210–220° C. and 1–1.5 mm. pressure. The product has the structural formula

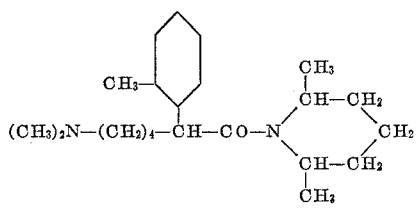

EXAMPLE 6

*N-(α-phenyl-γ-N-pyrrolidinobutyryl)piperidine*

A mixture of 60 parts of N-α-toluylpiperidine, 8 parts of lithium amide and 450 parts of anhydrous toluene is stirred and refluxed for 3 hours. Then 40 parts of N-(β-chloroethyl)pyrrolidine are added and refluxing is continued for 5 hours. The reaction mixture is extracted with dilute hydrochloric acid and the extract is rendered alkaline and extracted with ether. The ether extract is dried over anhydrous potassium carbonate, filtered and evaporated and the residue is distilled at about 2 mm. pressure. N-(α-phenyl-γ-N-pyrrolidinobutyryl)piperidine is collected at about 216–219° C. This compound has the structural formula

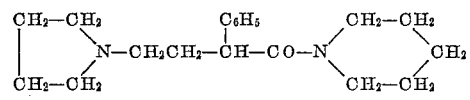

EXAMPLE 7

*N-(α-phenyl-γ-diethylaminobutyryl)morpholine*

160 parts of morpholine, 121 parts of α-toluyl chloride and 850 parts of toluene are mixed with cooling and permitted to stand at room temperature for 15 hours. The reaction mixture is filtered and the filtrate is washed with dilute hydrochloric acid and water, dried over anhydrous calcium chloride, filtered and evaporated. The residual oil solidifies on standing at room temperature. Crystallized from ethanol, N-α-toluylmorpholine melts at about 62–64° C.

49 parts of N-α-toluylmorpholine are dissolved in 450 parts of toluene. 170 parts of solvent are distilled off in order to insure dryness. Then 40 parts of β-chloroethyldiethylamine and 8 parts of lithium amide are added and the reaction mixture is stirred and refluxed for 15 hours. After cooling, the mixture is extracted with dilute hydrochloric acid. The extract is rendered alkaline by addition of dilute potassium hydroxide and extracted with ether. This ether extract is dried over anhydrous potassium carbonate, filtered and evaporated to yield N-(α-phenyl-γ-diethylaminobutyryl)morpholine which is distilled at about 207–215° C. and 2 mm. pressure. Treatment of a butanone solution with alcoholic hydrogen chloride and cooling yields the crystalline hydrochloride which melts at about 185–186° C. This salt has the structural formula

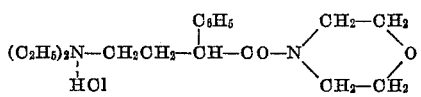

EXAMPLE 8

*N-(α-phenyl-δ-N-morpholinopentanoyl)morpholine*

A mixture of 25 parts of N-(α-toluyl)morpholine, 24 parts of N-(γ-chloropropyl)morpholine, 8 parts of sodamide and 200 parts of anhydrous toluene is turbinated at reflux temperature for 12 hours. Then ice and dilute hydrochloric acid are added. The aqueous layer is separated, washed with ether, rendered alkaline by addition of dilute sodium hydroxide and extracted with ether. This ether extract is dried over anhydrous potassium carbonate, filtered and evaporated to yield N-(α-phenyl-δ-morpholinopentanoyl)morpholine as an oil. This compound has the structural formula

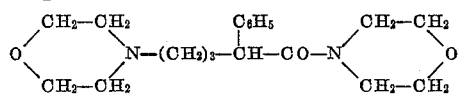

EXAMPLE 9

*N-(α-phenyl-δ-isopropylaminopentanoyl)pyrrolidine*

A stirred mixture of 100 parts of N-α-toluylpyrrolidine, 16 parts of lithium amide, 85 parts of 1,3-dichloropropane and 900 parts of toluene is refluxed for 10 hours, cooled and washed with water. The organic solution is dried over anhydrous potassium carbonate, filtered and freed from volatile material under vacuum to yield N-(α-phenyl-δ-chloropentanoyl)pyrrolidine.

A mixture of 100 parts of N-(α-phenyl-δ-chloropentanoyl)pyrrolidine and 50 parts of isopropylamine in 900 parts of anhydrous toluene is stirred at reflux for 5 hours. Then ice and dilute hydrochloric acid are added. The aqueous layer is separated, washed with ether, rendered alkaline by addition of dilute sodium hydroxide and extracted with ether. This ether extract is dried over anhydrous calcium sulfate, filtered and evaporated. The residue is vacuum distilled at about 2 mm. pressure. At about 175–185° C., N-(α-phenyl-δ-isopropylaminopentanoyl)pyrrolidine is collected. This compound has the structural formula

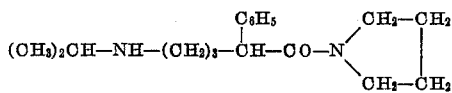

EXAMPLE 10

*N-(α-phenyl-δ-aminopentanoyl)pyrrolidine*

Treatment of N-(α-phenyl-δ-chloropentanoyl)pyrrolidine with ammonia by the method of the preceding example yields the N-(α-phenyl-δ-aminopentanoyl)pyrrolidine of the structural formula

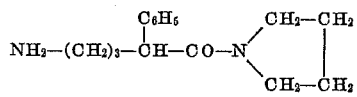

I claim:

1. A compound of the structural formula

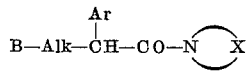

wherein Ar is a monocyclic aryl hydrocarbon radical containing 6 to 9 carbon atoms, Alk is a lower alkylene radical, B is a member of the class consisting of amino, lower alkylamino, di-(lower)alkylamino, pyrrolidino, piperidino, and morpholino radicals and X is a member of the class consisting of the —CH$_2$CH$_2$—O—CH$_2$CH$_2$— radical and lower alkylene radicals containing 4 to 7 carbon atoms of which at least 4 and no more than 5 are in nuclear position.

2. A pyrrolidide of the structural formula

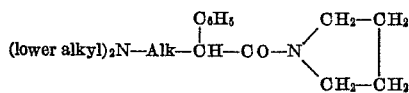

wherein Alk is a lower alkylene radical.

3.

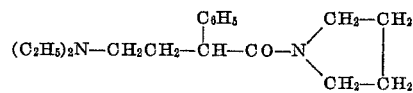

4. A piperidide of the structural formula

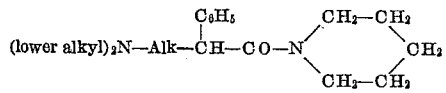

wherein Alk is a lower alkylene radical.

5.

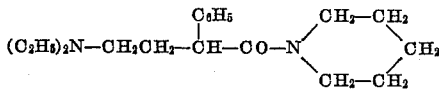

6.

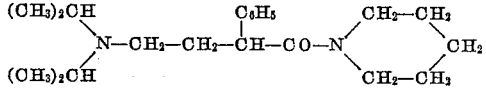

7. A piperidide of the structural formula

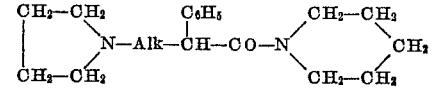

wherein Alk is a lower alkylene radical.

8.

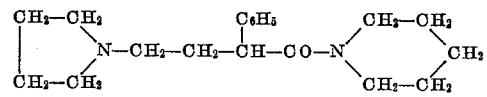

9. A morpholide of the structural formula

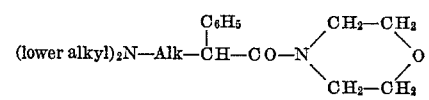

wherein Alk is a lower alkylene radical.

10.

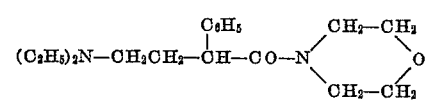

11. The process of preparing a compound of the structural formula

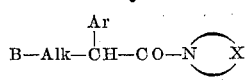

wherein Ar is a monocyclic aryl hydrocarbon radical containing 6 to 9 carbon atoms, Alk is a lower alkylene radical, B is a member of the class consisting of lower di-(lower)alkylamino, pyrrolidino, piperidino and morpholino radicals and X is a member of the class consisting of the —CH₂CH₂—O—CH₂CH₂— radical and lower alkylene radicals containing 4 to 7 carbon atoms of which at least 4 and no more than 5 are in nuclear position, which comprises heating in an inert organic solvent a mixture of a compound of the structural formula

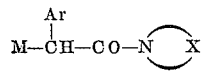

wherein M is an alkali metal of a molecular weight smaller than 25, and a compound of the structural formula B-Alk-halogen wherein the halogen atom has a molecular weight greater than 30.

References Cited in the file of this patent
UNITED STATES PATENTS 2,638,467  Heilbron _____ May 12, 1953

FOREIGN PATENTS 504,085  Belgium _____ July 14, 1951

OTHER REFERENCES

Simons: Ind. and Eng. Chem., vol. 39, p. 238 (1947).